D. S. McNamara.

Mower.

Reissued May 7, 1861.

No. 75
No. 1180

Witnesses
Wm. Hooper Hale
A. C. Widdicomb

Inventor
D. S. McNamara
By his Attorney
Thos. H. Dodge

UNITED STATES PATENT OFFICE.

D. S. McNAMARA, OF TROY, NEW YORK, ASSIGNOR TO G. M. SELDEN.

IMPROVEMENT IN HARVESTERS.

Specification forming part of Letters Patent No. 21,612, dated September 28, 1858; Reissue No. 1,180, dated May 7, 1861.

DIVISION B.

*To all whom it may concern:*

Be it known that I, DAVID S. McNAMARA, formerly of North Hoosic, New York, but now of Troy, in the county of Rensselaer and State of New York, have invented certain new and useful Improvements in Grain and Grass Harvesters; and I do hereby declare that the following is a clear, full, and exact description of the same, reference being had to the accompanying drawings, forming a part of this specification, and in which—

Figure 1:
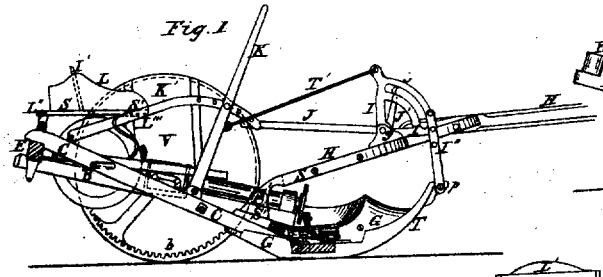
Figure 5:
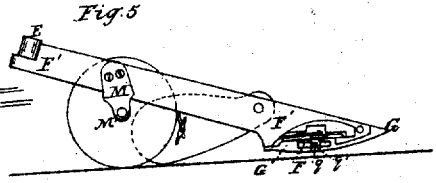
Figure 4:
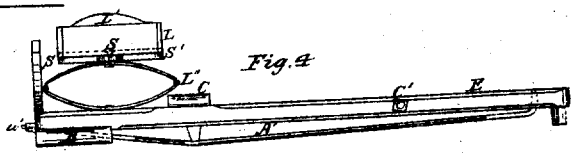
Figure 2:
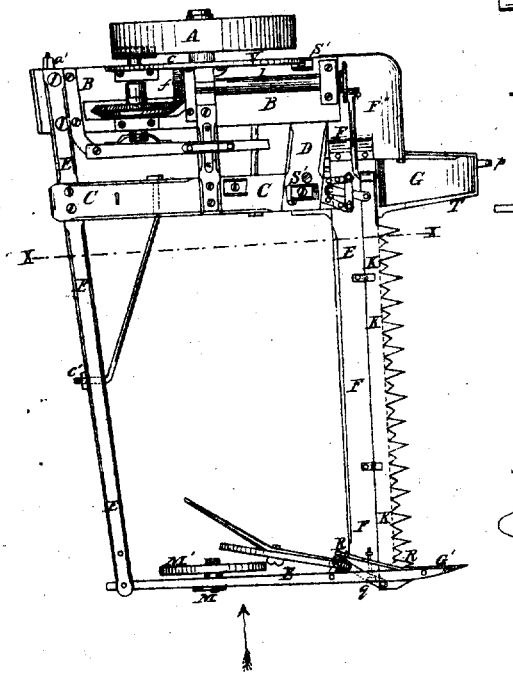
Figure 3:
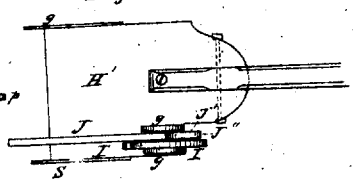
Figure 7:
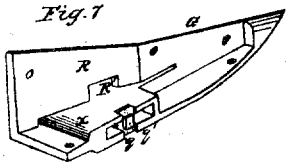
Figure 6:
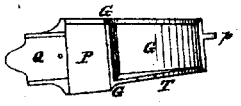

Figure 1 represents a section on line *x x*, Fig. 2. Fig. 2 represents a plan or top view of the machine, with the seat, tongue, and lever for raising the cutting apparatus removed in order to show the frame-work more fully. Figs. 3, 4, 5, 6, and 7 represent views of certain parts of the machine detached.

The main frame of the machine is composed of pieces B, C, D, and E, the latter extending out in an elevated position in rear of the finger-beam F, as indicated and shown in Figs. 1 and 2. That side of the machine which runs next to the standing grass I call the "inside" of the frame, while that next to the cut grass or grain, and by the side of which the main wheel A runs, I call the "outside" of the frame. The construction of the main frame is such that the rear of the frame, together with the front outer corner thereof, is elevated above the ground, while the front inner corner is depressed down near the ground. This is effected by fastening piece E to the top of B, while piece D is fastened to the under side of B and to the top of C, the rear of the latter being fastened to the top of E. In this way the front end of C is inclined down, as fully shown in Fig. 1. It will also be observed that the pieces D and E converge toward each other as they extend from piece B, so that after being fastened to piece C a frame of great strength is produced, owing to the bracing position of the parts D and E.

The nature of my invention which forms the subject of this patent has for its object the raising of the shoe which supports the heel of the finger-beam and cutting apparatus, and supporting the weight so raised from the rear of the tongue in that class of grass-harvesters which have a hinged tongue, in order to pass over cut grass and other obstructions—such as stumps and stones—either in the path of the machine while in operation or when passing from one field to another.

In the drawings I have shown the invention in question or improvements applied to a McNamara grass-harvester; but I do not deem a detailed description of the machine necessary, only so far as is necessary to a clear understanding of the present invention, since the various parts of the machine are fully set forth by me in other patented divisions of even date herewith. The depressed end of piece C is placed in groove or recess Q, formed in a metallic shoe, G, and the heel of the finger-beam F is placed in a groove or recess, P, formed or cast in the top of the same shoe, so that when said shoe and the parts before named are bolted together a very strong union is formed. The inner end of the finger beam or bar is fastened to the metallic shoe G′, which is cast with a horizontal opening to receive a tenon cut on the end of the finger-beam, the parts being held together by a bolt, *q*, and metal washer-piece *q′*, in connection with a nut let into the top of the finger-beam. The end piece, E′, connects shoe G′ with piece E, so that the frame, finger-beam, and cutter *k* oscillate when rocked back and forth on wheels A and M′, the former being the drive-wheel.

L is the driver's seat, supported in rear by an elliptical spring, L″, and in front by a bent spring, L‴. The seat is adjustable, so as to be easily moved back and forth on cross-piece composed of pieces S S′.

H H′ constitute the tongue or draft-beam, the rear end of which is provided with curved metallic eye-pieces *s s*, which are hinged between projections or ears *s′ s′*, fastened to the upper side of the main frame, the inner ear-piece being raised by a piece, *s″*, so as to be on a level with the other. The team is to be attached to a tongue or draft-beam, H H′, in any well-known manner. The front of the metallic shoe G, to which the heel of the finger beam or bar E is fastened, curves up in front like a runner, as shown at T, and has a projection, *p*, on the front upper side, to which is attached one end of a link-piece, I″, by a yielding joint, the other end being connected in a similar manner to a horizontal arm, which projects forward at right angles, or nearly so, to another arm, which projects up in a vertical position, both being connected, and constituting a right-angled lever, I, having its fulcrum *g* supported upon the rear inside of the hinged tongue H H′. The upper end of the vertical arm of lever I is connected by any suitable flexible material—such as a wire rope or chain—to lever K, whose lower end is hinged to the main frame at *t*, while a stop-piece, K′, is hinged to the frame at 10, its front part being curved, and provided with a series of holes, as shown in Fig. 1. The front of stop-piece K′ passes through a slot in lever K.

When the machine is in operation, the weight of the frame, cutting apparatus, and driver is to be so regulated and adjusted as that shoe G and the finger-bar will remain down to the ground, so as to cut the stubble short, care being taken to avoid too much weight being thrown upon the shoe, in order to avoid friction on the ground.

When the driver wishes to elevate the cutter-bar, to avoid an obstruction in the path of the machine, he takes hold of lever K and draws it back, thereby causing the vertical arm of lever I to turn back, and the horizontal arm of the same lever to turn up, lifting, at the same time, the shoe which supports the heel of the finger beam or bar, and consequently the cutting apparatus. If the obstruction only requires the raising of the cutting apparatus for a short time, the driver does not let go of lever K until the obstruction is passed, when he allows the lever to swing back until the shoe rests on the ground again; but if it is necessary to keep the cutting apparatus elevated for some little distance, as is the case when passing over a field of cut grass or from one field to another, then the driver, after he has raised the cutting apparatus sufficiently, inserts a pin through one of the holes in stop-piece K′ in front of lever K, when the cutting apparatus will remain elevated without further attention from the driver.

It is sometimes convenient for the driver to be able to elevate the cutter without using his hands for that purpose, and which he can do in my machine by pressing his foot against the long arm J of a right-angled lever whose axis of motion is the same as that of I, whereby the short arm J′ is caused to move back, thus bringing its projection J″ against the end of a curved slot formed in lever I, and in which the said projection J″ works. In this way the driver can operate lever I with his feet and cause the cutting apparatus to be raised. He can also, when necessary, operate lever I with his hand, while using his feet to assist in the operation, in consequence of the above arrangement of parts.

It is a great advantage to have a hinged tongue, so as to avoid raising or depressing the cutters whenever the front of the tongue is raised or depressed. As these machines have heretofore been constructed, there has been great objections to the mode of raising the cutting apparatus, in that the operation required too much exertion on the part of the driver, or else interfered too much with the proper management of the team; but these objections I have endeavored to obviate by the above improvements.

When the machine is in operation, the driver from his seat on the machine can cause the shoe which supports the heel of the finger-beam and cutting apparatus to be raised, so as to press very lightly on the stubble or ground, or be raised entirely above both, while the weight thus raised will be suspended from the rear of the tongue or draft-beam.

In connecting the horizontal arm of the right-angled lever, whose fulcrum is supported by the rear end of the tongue to the point of the shoe, the operation is much facilitated by having a projection cast on the front upper end of the shoe, with a hole bored therein. It is also important to have the connection so formed that the distance between the point of the shoe and the end of the horizontal arm can be regulated at pleasure, with a view to an easy adjustment of the shoe and cutting apparatus to the ground to be passed over or the grass to be cut.

The object of interposing lever K and connection I′ between stop K′ and lever I is to give a more gradual inclination to the parts which connect the heel of the finger-beam to the machine, thus rendering the union of the parts more firm and less liable to break or be wrenched out of place.

Having described one mode of applying the improvements which form the subject-matter of this patent to practical use, it is unnecessary to indicate the manner of applying the improvements to other machines, as the ordinary skill of a constructer will be sufficient for that purpose. Therefore

What I claim as my invention under this patent is—

1. The combination and arrangement, with a hinged tongue or draft-beam of a grain or grass harvester, of a lever or lifting device in such a manner as that when the upper end of the lever is drawn back by the driver the cutting apparatus will be raised by the other end of said lever above the ground and be suspended from the tongue, substantially as described.

2. The combination of a right-angled lever with the rear side of a hinged tongue of a grass-harvester, and so connected with the shoe which supports the heel of the finger-beam and cutter-bar as that when the long arm of said lever is drawn back by the driver the power will be communicated from the short arm of said lever to said shoe, causing raised or elevated above the ground and supended from the tongue, for the purposes stated.

3. The combination of finger-beam F, shoe G, adjustable connection I″, lever I, and hinged tongue, or their equivalents, substantially as described.

In witness whereof I have hereunto signed my name.

DAVID S. McNAMARA.

In presence of—

JOHN M. LANDON,
JOHN H. PECK.